(12) United States Patent
Bankus et al.

(10) Patent No.: US 6,448,896 B1
(45) Date of Patent: Sep. 10, 2002

(54) AIR FILTER MONITOR FOR HVAC UNITS

(75) Inventors: Roger S. Bankus, East Syracuse; Thomas L. DeWolf, Clay; Robert P. Dolan, Syracuse; Brian D. Inman, East Syracuse, all of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/935,946

(22) Filed: Aug. 24, 2001

(51) Int. Cl.[7] .............................................. G08B 21/00
(52) U.S. Cl. ....................... 340/607; 340/609; 236/49.3
(58) Field of Search ................................ 340/577, 580, 340/584, 606, 607, 609, 610, 611; 236/49.3, DIG. 9; 62/204, 224, 228.3; 318/812, 814

(56) References Cited

U.S. PATENT DOCUMENTS

| | | | |
|---|---|---|---|
| 5,102,040 A | * 4/1992 | Haarvey | 236/49.3 |
| 5,587,642 A | * 12/1996 | Manson et al. | 318/812 |
| 5,596,271 A | * 1/1997 | Lowery | 324/174 |
| 5,689,963 A | * 11/1997 | Bahel et al. | 62/129 |
| 5,772,732 A | * 6/1998 | James et al. | 95/25 |
| 6,319,114 B1 | * 11/2001 | Nair et al. | 236/49.3 |

\* cited by examiner

*Primary Examiner*—Van Trieu
(74) *Attorney, Agent, or Firm*—William F. White

(57) ABSTRACT

An electronic system for monitoring the condition of the filter in an HVAC unit includes a controller which issues at least one command to a circuit for the motor of the fan producing airflow through the filter. The command to the driver circuit is associated with a desired run speed for the fan. The controller is operative to compute the speed of the fan following issuance of the command to the motor drive circuit. This computed speed is compared to a predetermined fan speed that would normally occur when the filter is dirty. The electronic system is operative to generate a warning in the event that the computed fan speed does not compare favorably with the predetermined fan speed.

13 Claims, 5 Drawing Sheets

AIR FILTER MONITOR FOR HVAC UNITS

BACKGROUND OF INVENTION

This invention relates to monitoring the condition of a component in a heating, ventilating and air conditioning unit and, in particular, to monitoring the condition of an air filter.

A heating, ventilating and air conditioning unit (HVAC unit) typically includes a filter which filters the air being drawn into the unit. The filter will lose its ability to properly filter the incoming air over time due to the build up of airborne particles captured by the filter. It is usually difficult to visually inspect the condition of the filter for such a build up without dismantling the unit itself. In order to provide an automatic indication of air filter condition that does not require visual inspection, systems have been developed that track the accumulated run time of a fan that draws air into the unit. When the accumulated run time exceeds a certain limit, a warning is given that the filter needs to be replaced. This way of detecting a dirty filter is not all that accurate because it does not take into account the quality of the air being processed through the unit. In this regard, relatively clean air will allow for a longer filter lifetime than if lower quality air is being processed through the unit. What is needed is a more accurate measurement of the condition of the filter itself.

The present invention provides an HVAC unit with an electronic system for detecting the condition of the filter in the unit regardless of the environment in which the unit is operating in. The electronic system includes a microprocessor control, which defines at least one command for a driver circuit for the motor of the fan producing airflow through the filter. The command to the driver circuit is preferably associated with a desired run speed for the fan. The computer control is operative to thereafter compute speed of the fan following issuance of the command to the motor drive circuit. This computed speed is compared to a predetermined fan speed that will occur when the filter is dirty. The electronic system is operative to generate a warning in the event that the computed fan speed does not compare favorably with the predetermined fan speed.

In a preferred embodiment, the computer control has the ability to issue more than one command to the driver circuit for the fan motor. Each such command is associated with a stored fan speed that can be used to determine whether a computed fan speed indicates a dirty filter. In a further preferred embodiment, the electronic system is operative to learn and define the one or more operating speeds indicative of a dirty filter condition for the particular unit. These values are stored to for use by the electronic system in determining whether a clean or dirty filter is present in the unit.

BRIEF DESCRIPTION OF THE DRAWINGS

For a fuller understanding of the invention, reference should now be made to the following detailed description taken in conjunction with the accompanying drawings, wherein.

DESCRIPTION OF THE PREFERRED EMBODIMENT

Figure 1:
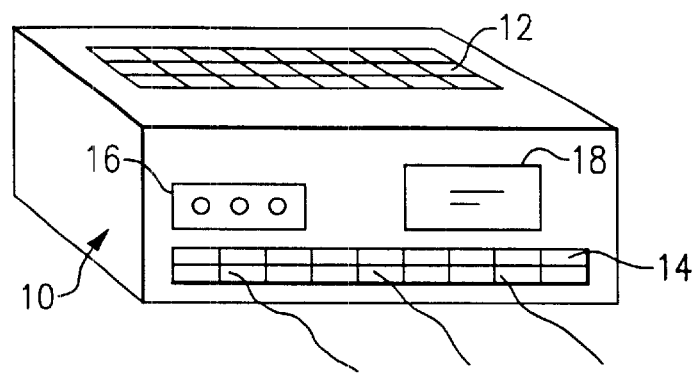
FIG. 1 illustrates an indoor air conditioning unit, which provides either heated or cooled air to a space.

Referring to FIG. 1, an air conditioning unit 10 is depicted wherein air is brought in through an air intake 12 and conditioned before exiting at an outlet 14. The air may be filtered before exiting at the outlet 14 or it may be filtered in conjunction with being heated or cooled by the air conditioning unit 10. The unit 10 may include a keypad 16 for selecting various operating modes of the unit including the selection of a fan speed for the fan within the unit 10. The unit 10 may also include other devices for entering information on operating modes and fan speeds. These could include a remote control device with a keypad or other form of selective entry or the unit could receive information over a hard wired bus connected to a higher level control The unit 10 also contains a display 18 which can consist of light emitting diodes, each having an assigned significance or a display screen such as a liquid crystal display that displays particular messages.

Figure 2:
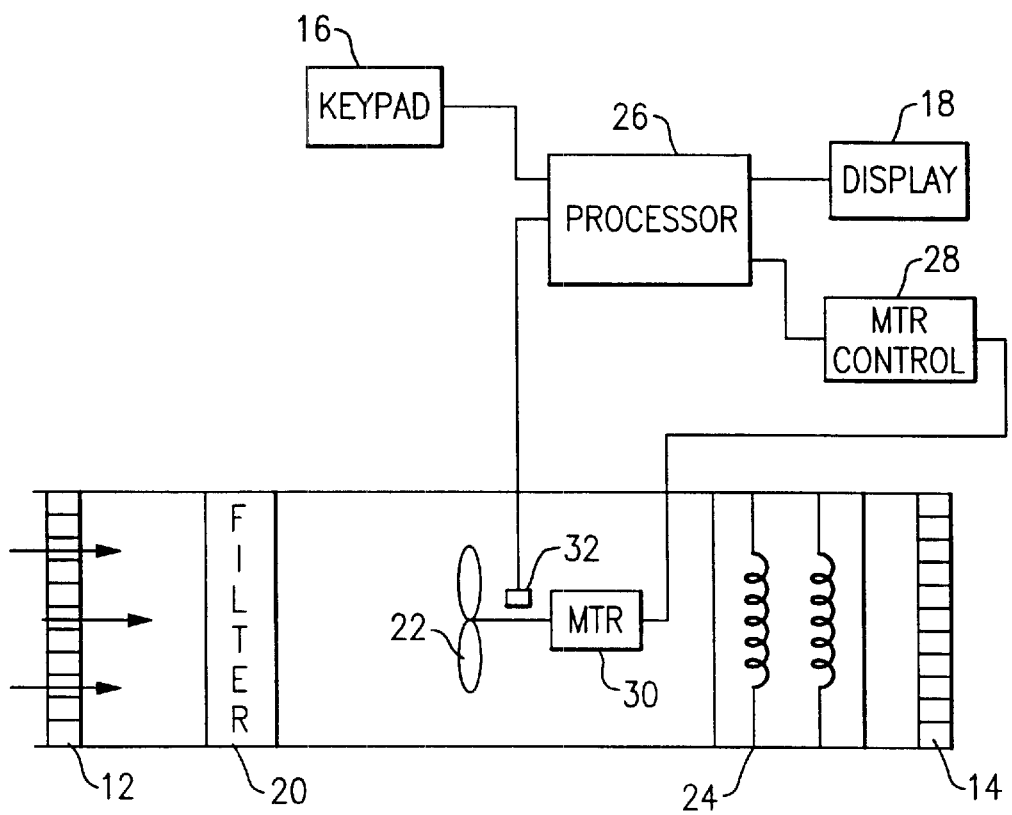
FIG. 2 illustrates the flow of air through the air conditioning unit of FIG. 1.

Referring now to FIG. 2, the air flow path through the air conditioning unit 10 is illustrated in schematic form. Air is drawn through the intake 12 and through a filter 20 by a fan 22. The filtered air is heated or cooled by coils such as 24, if heating or cooling is required. The conditioned air exits at the air outlet 14.

A processor 26 issues commands to a motor control 28 which controls a fan motor 30 that drives the fan 22. It is to be appreciated that the particular motor drive command issued by the processor will depend on the type of motor control 28 and fan motor 30 associated therewith. For instance, the drive command could be a particular phase-delay command to a phase fired triac which drives an inductance motor. It may also be a particular frequency command to a variable frequency motor control or it may be a particular command for a sequence of pulses to a stepping motor. In any of these cases, the particular type of motor drive command results in the motor driving the fan 22 at a particular speed.

The processor 26 is also connected to the key pad entry 16 as well as to the display 18 of the air conditioning unit 10. As will be explained hereafter, the processor 26 is operative to take various selections of fan speed from the keypad entry 16 and issue appropriate command signals to the motor control 28 so as to thereby energize the motor 30 to rotate the fan 22. The processor is furthermore operative to sense the speed of the driven fan 22 by a sensor 32 which preferably senses the rotations of the fan drive shaft. The sensed rotations of the fan drive shaft are used by the processor to compute the speed of the fan, which is thereafter used to determine whether or not the filter 20 is clean or in need of replacement.

Figure 3A:
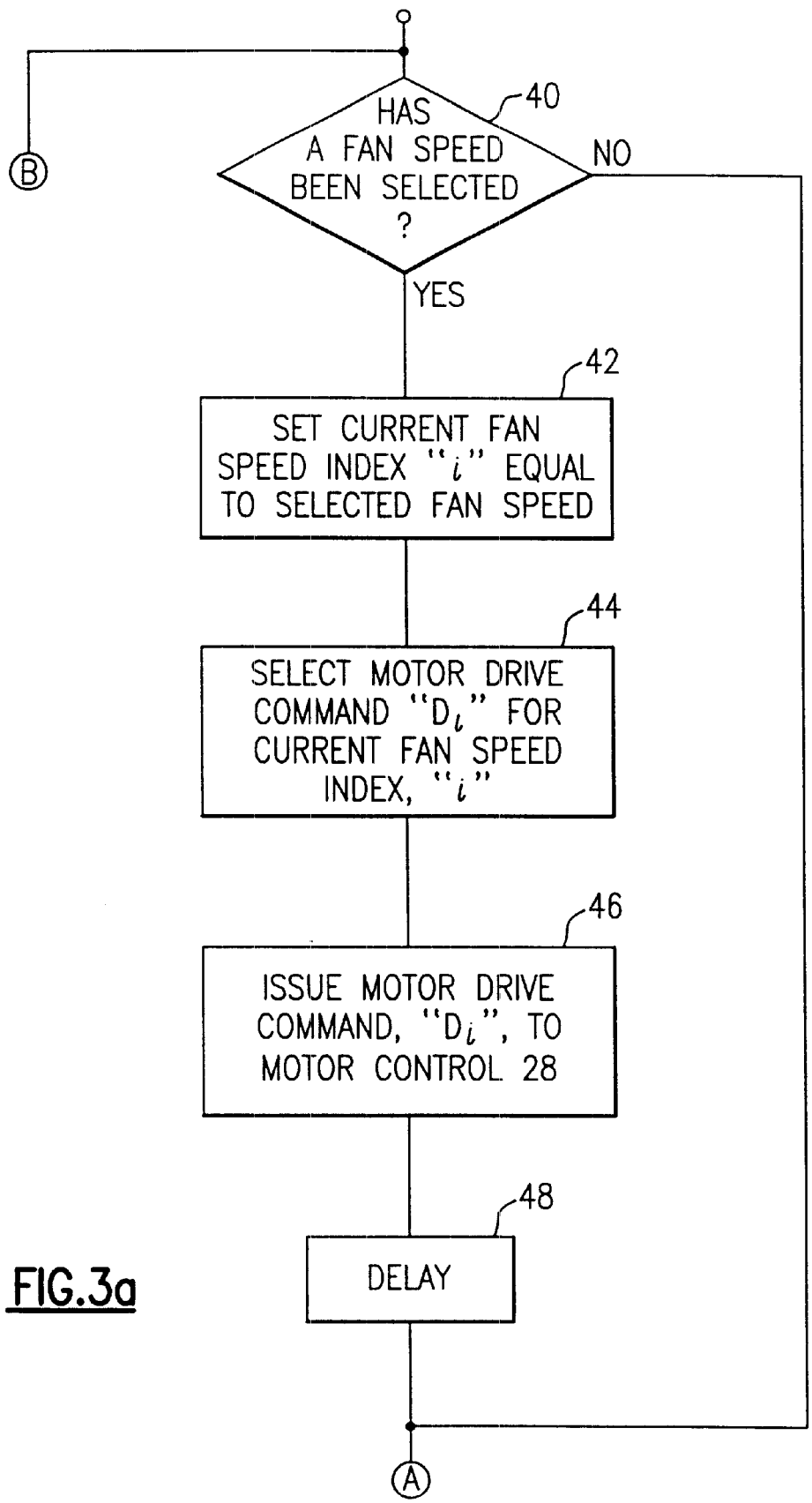
FIG. 3 is a flow chart of the process used by a controller to monitor the speed of a fan governing the flow of air through the air conditioning unit of FIG. 1.
Figure 3B:
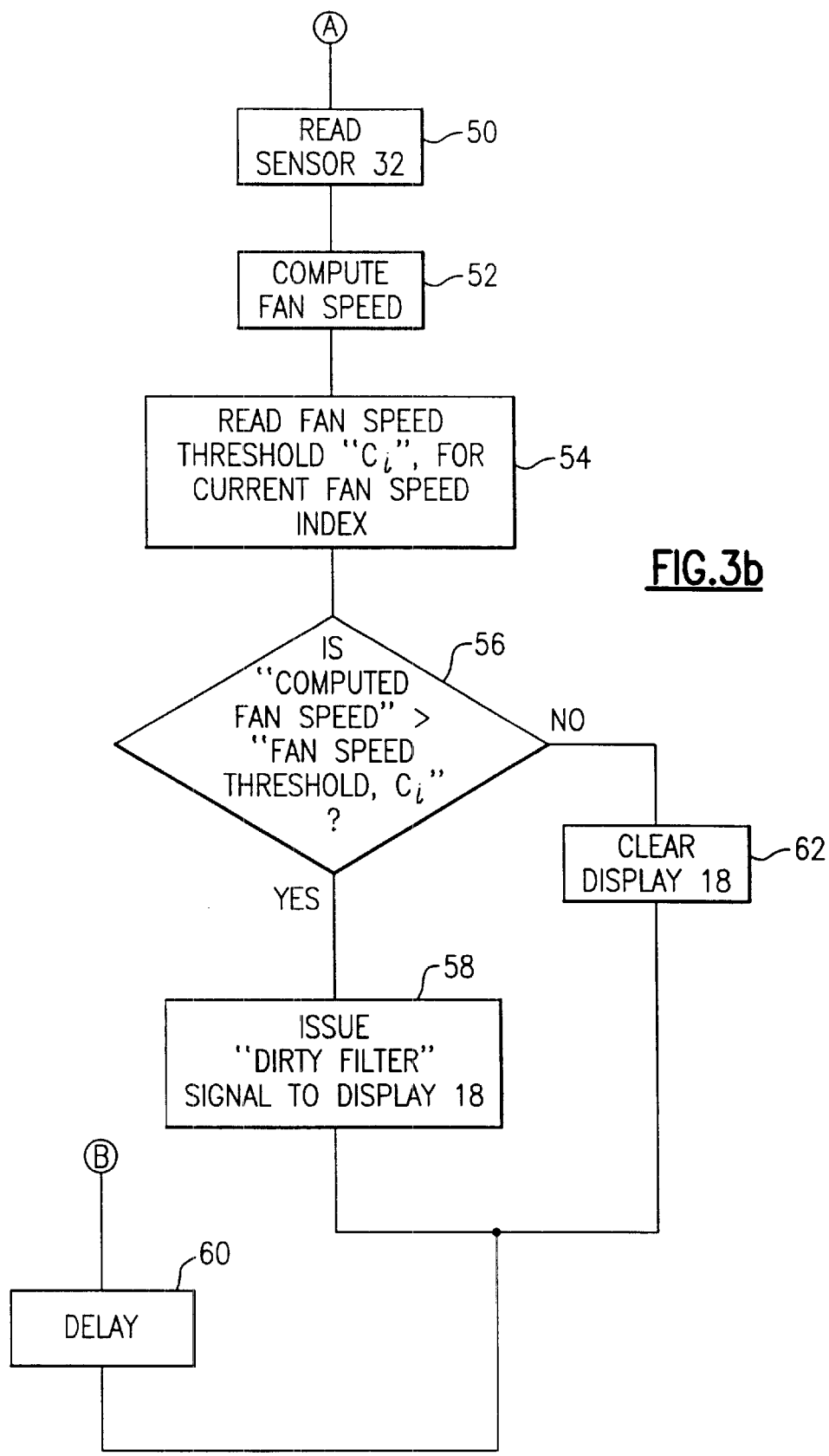

Referring now to FIG. 3, a flowchart of the process executed by the processor 26 so as to determine the condition of the filter 20 is illustrated. The process begins with a step 40 wherein the processor inquires as to whether a fan speed has been selected. A fan speed will have been selected if an entry has been made on the keypad 16 and noted by the processor 26. The selected fan speed, as indicated by the keypad 16, is preferably a fan speed level such as low, medium, high or still further speed levels. In the event that one of the above entries has been made, the processor will duly note that the same has occurred when executing step 40.

The processor will proceed to a step 42 and select a current fan speed index corresponding to the read fan speed level. The fan speed index may be a numerical index wherein an index value of one might correspond to a low fan speed level. If the selected fan speed were medium, then the fan speed index might be two, and if the fan speed index were for instance high, then the fan speed index might be three.

Figures 4, 5A:
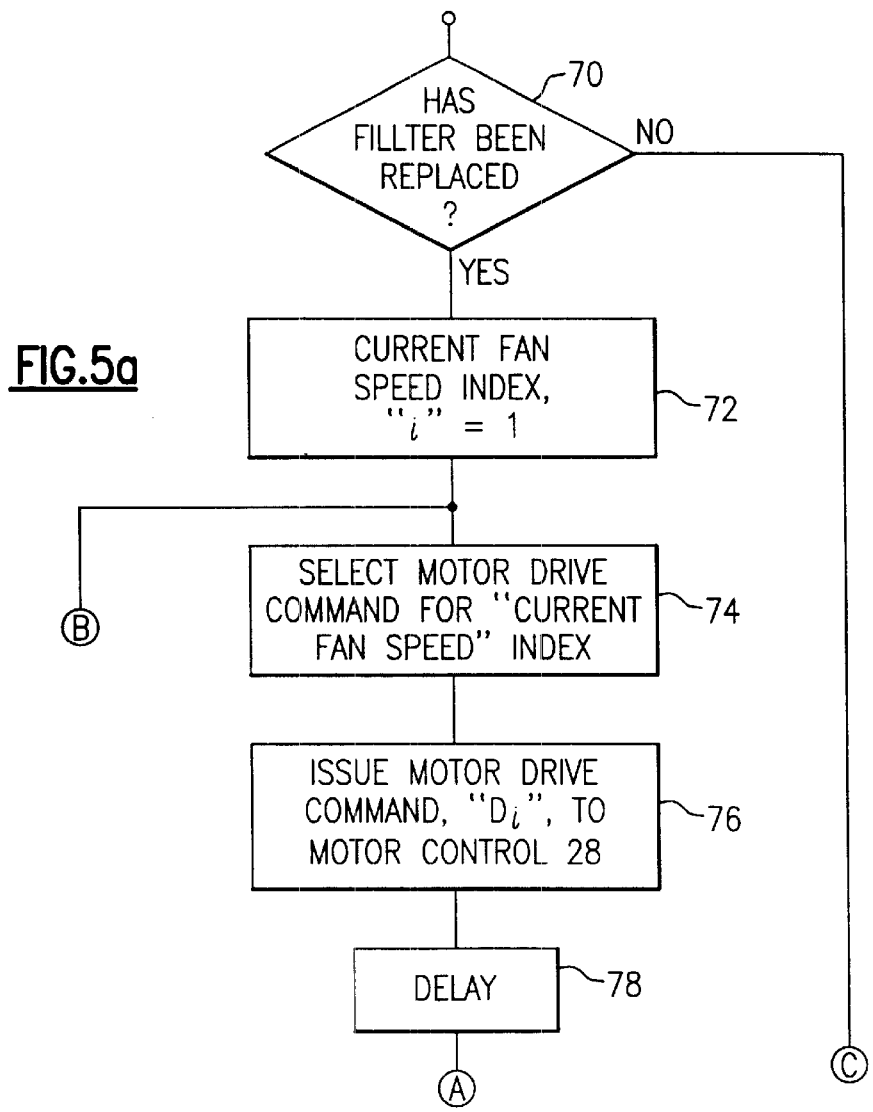
FIG. 4 illustrates the storage of values used in the process of FIG. 3 to monitor the speed of the fan.

The processor proceeds to a step 44 and selects a motor drive command for the value of the current fan speed index. This step is preferably accomplished by the processor accessing a table of stored drive values in association with fan speed indexes, such as is illustrated in FIG. 4. Assuming that the current fan speed index is one, then the drive value $D_1$ will be selected from the table of associated drive values. It is to be appreciated that the drive values $D_1$–$D_n$ will be appropriate values that cause the motor control 28 to drive the motor 30 at the particular speed level required by the current fan speed index. The processor proceeds to a step 46 and issues the selected motor drive command $D_i$ to the motor control 28. As has been previously noted, the particular motor drive command will depend on the type of motor control 28 and motor 30 associated therewith. The processor proceeds in a step 48 to time out a delay before reading the sensor 32 in a step 50. The delay that is timed out in step 48 is preferably set so as to allow the motor 30 to reach a stable fan drive speed. The processor preferably takes a number of readings of the sensor 32 in step 50 so as to allow for a computation of the speed of the fan 22 in step 52.

The processor proceeds to a step 54 and reads a fan speed threshold $C_i$ for the current fan speed index "i". This is preferably done by accessing the fan speed threshold for a dirty filter condition corresponding to the particular fan speed index "i" in a table such as shown in FIG. 4. Assuming that the fan speed index is one as a result of a selected low level of fan speed, then the processor will select $C_1$ from the stored table of FIG. 4 in step 54. A different fan speed threshold would be selected for a medium, high, or other fan speed with a corresponding fan speed index.

The processor proceeds to a step 56 and compares the computed fan speed with the fan speed threshold $C_i$ defined in step 54. In particular, the processor will inquire as to whether the computed fan speed is greater than the fan speed threshold $C_i$. In this regard, it has been determined that the fan speed will increase when the filter 20 has captured a sufficient amount of air borne particles. This is due to a drop in the volume of air being moved by the fan downstream of the filter. In the event that the computed fan speed exceeds the fan speed threshold, then the processor proceeds to a step 58 and issues a dirty filter signal to the display 18. Depending on the configuration of the display 18, either an appropriate light or flashing light will be triggered or in the case of a message display, then an appropriate message will be displayed on a screen such as a liquid crystal display. The processor will proceed back to step 40 after an appropriate delay in a step 60. The processor will again inquire as to whether a fan speed has been selected. In the event that a fan speed has not be selected, the processor will proceed along the no path out of step 42 to step 50 wherein the sensor 32 will again be read and the fan speed thereafter computed in step 52. The computed fan speed will again be compared with a read fan speed threshold for the current fan speed index, which will not have changed if a fan speed has not been selected in step 40. The computed fan speed will be compared with the fan speed threshold, $C_i$ in a step 56 before proceeding to either step 58 or a step 62 in the event that the computed fan speed is no longer greater than the fan speed threshold $C_i$. It is to be appreciated that this latter event may occur if the filter 20 is not sufficiently contaminated so as to continually produce the same effect on the fan 22 or if the filter 20 has been replaced. In the latter event, the filter will be clean so as to thereby produce an airflow to the fan 22 so as to produce a computed fan speed which will not be greater than the fan speed threshold in step 56.

Referring to FIG. 4, it is to be noted that there is both a speed indicated for a clean filter and a fan speed indicated for a dirty filter. The speed for the dirty filter condition is preferably a positive incremental speed above that of the speed for the clear filter condition. This may either be set in a factory calibration or it may be done in accordance with the process of FIG. 5.

Figure 5B:
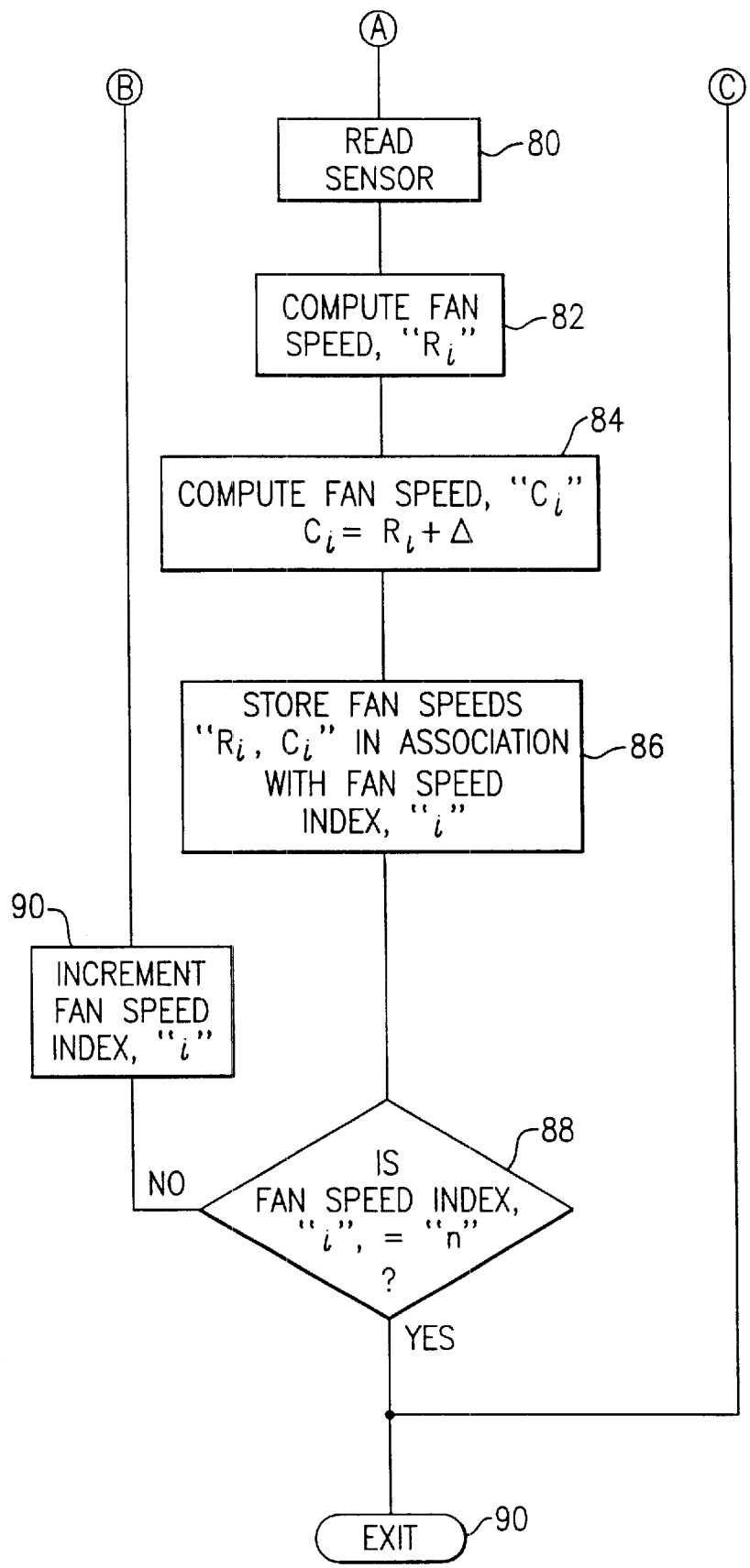
FIG. 5 is a flowchart of a process used to define the table of values in FIG. 4.

Referring to FIG. 5, the processor inquires in a step 70 as to whether the filter 20 has been replaced in the air conditioning unit 10. It is to be appreciated that this could be provided to the processor by an entry on the keypad 16 or by an electrical contact at the location of the filter. The electrical contact when disengaged and thereafter again engaged would indicate that a filter has been removed and thereafter replaced with another one. If the processor notes that a filter has been replaced, then the processor will proceed to a step 72 and set the current fan speed index "i" equal to one. The processor will proceed to select a motor drive command $D_i$ corresponding to the current fan speed index. Since the fan speed index will initially be one, the motor drive command $D_1$ will be selected in step 74. The processor will proceed in a step 76 to issue the selected motor drive command to the motor control 28. The processor will implement a delay in step 78 before making a number of readings of the sensor 32 in a step 80. The readings of the sensor are used compute a fan speed "$R_i$" in a step 82. It is to be appreciated that the computed fan speed in step 82 will be the fan speed for a clean filter at the selected fan speed level. The processor proceeds in a step 84 to compute a dirty fan speed $C_i$ by adding an amount of speed $\Delta$ to the computed fan speed $R_i$. The amount, $\Delta$, is preferably a difference in fan speed that has been previously derived empirically through observation as to when a filter becomes dirty in a particular flow path in a particular air conditioning unit. It is to be noted that $\Delta$ is a constant in the preferred embodiment but could be a variable amount, depending on the particular speed level that is being used to compute the relative values of $C_i$ and $R_i$. In the latter event, there would be a particular $\Delta$ for each speed level used in step 84. A processor proceeds in step 86 to store both the fan speeds $R_i$ and $C_i$ in association with the current fan speed index "i". The processor proceeds to step 88 and inquires as to whether the index "i" is equal to "n". In the event that the fan speed index is not equal to "n", then the processor will proceed in a step 90 to increment the fan speed index before returning to step 74 and selecting a motor drive for the fan speed index. The processor will again issue the appropriate motor drive command and compute the fan speed $R_i$ and thereafter compute the fan speed $C_i$ for a dirty filter before storing both fan speeds $R_i$ and $C_i$ in association with the then current fan speed index. These steps will be repeated until the fan speed index has been incremented to "n" and the corresponding fan speeds computed for that value of the fan speed index. At this time, the processor will exit from step 88 and proceed to step 92 and exit the process of FIG. 5.

It is to be appreciated that the fan speed thresholds $C_i$ for each fan speed index could also be established by merely inserting a dirty filter into the air conditioning unit and noting the corresponding fan speed for such a dirty filter. These fan speed thresholds could be stored in memory so as to be available for use in the process of FIG. 3 for depicting dirty filter conditions.

It is to be appreciated that a preferred embodiment for automatically detecting a dirty air filter within an air conditioning unit has been disclosed. Alterations and modifications to the thus disclosed system and process may occur without departing from the scope of the invention. For example, the fan could be positioned upstream of the filter so as to cause a different comparison of fan speed to predetermined speed in step 56. In particular, the inquiry in step 56 would be whether computed fan speed is less than the predetermined fan speed in this situation. Accordingly, the foregoing description of the preferred embodiment is to be limited only by the following claims and equivalents thereto.

What is claimed is:

1. A unit for conditioning air having an air filter located in an air flow path and a fan for causing air to flow through the filter; wherein said unit includes a system for detecting whether the air filter needs to be replaced based upon a reading of the speed of the fan, said system comprising:
   a sensor for detecting movement of the fan;
   a device for entering an indication of desired speed for the fan;
   a motor control connected to the motor for the fan; and
   a processor operative to note the entered indication of desired speed for the fan and to thereafter select a command for the motor control based upon the entered indication of desired speed so as to cause the motor to rotate the fan at the desired speed when the air filter located in the air flow path is clean, said processor being responsive to the output of said sensor for computing the speed of the fan, said processor being furthemore operative to compare the computed speed with a predetermined speed of the fan associated with the entered indication of desired speed for the fan, the predetermined speed being indicative of a dirty filter located in the air flow path when the motor control is commanded to rotate the fan at the desired speed, said processor being furthermore operative to generate a signal indicating when a dirty filter has been detected as a result of comparing the computed speed with the predetermined speed.

2. The unit for conditioning air of claim 1 wherein said system for detecting whether the filter needs to be replaced further comprises:
   a display for receiving the output signal from said processor so as to display an indication that the filter needs to be replaced.

3. The unit for conditioning air of claim 1 wherein the predetermined speed of the fan indicative of a dirty filter is selected by said processor based upon an association with the entered indication of speed for the fan.

4. The unit for conditioning air of claim 3 wherein the predetermined speed of the fan indicative of a dirty filter is selected from a table of stored predetermined speeds indicative of a dirty filter for associated entries of entered indications of speed for the fan.

5. The unit for conditioning air of claim 1 wherein the predetermined speed of the fan indicative of a dirty filter is a predetermined amount above the speed of the fan that would occur if a clean filter were installed in the unit.

6. The unit for conditioning air of claim 1 wherein said processor is operative to detect when a new filter is installed in the unit, said processor being thereafter operative to issue at least one command that causes the fan to be rotated at the desired speed associated with the entered indication of desired speed for the fan, said processor being furthermore operative to compute the speed of the fan from detected rotations of the fan provided by said sensor, said processor being thereafter operative to compute a speed indicative of a dirty filter using the computed speed based upon detected rotations of the fan provided by said sensor.

7. The unit for conditioning air of claim 6 wherein the computation of speed indicative of a dirty filter comprises adding a predetermined speed differential to the speed computed by detecting rotations of the fan.

8. A process for detecting whether a filter needs to be replaced within an air conditioning unit wherein air is caused to flow through a filter by a rotating fan said process comprising the steps of:
   noting that an indication as to a preferred fan speed has been selected;
   generating a command to a control for a motor which rotates the fan in response to the noted indication as to a preferred fan speed having been selected; and
   selecting a predetermined fan speed of the fan indicating when the filter needs to be replaced based upon the noted indication as to a preferred fan speed;
   detecting the speed of the rotating fan;
   comparing the detected speed of the fan with the selected predetermined speed of the fan indicating when the filer needs to be replaced; and
   generating an indication that the filter needs to be replaced when the detected speed does not favorably compare with the selected predetermined speed of the fan indicating the filter needs to be replaced.

9. The process of claim 8 wherein the selected predetermined speed of the fan is a predetermined amount greater than the speed of the fan produced by the motor rotating the fan in response to the noted indication as to preferred fan speed when a clean filter has been installed in the air conditioning unit.

10. The process of claim 8 wherein said step of comparing the detected speed of the fan with the selected predetermined speed of the fan occurring when the fan needs to be replaced comprises the step of:
   deciding whether the detected speed is greater than the selected predetermined speed of the fan occurring when the filter needs to be replaced.

11. The process of claim 8 wherein said step of selecting a predetermined fan speed of the fan indicating when the filter needs to be replaced comprises the step of:

accessing a table of predetermined fan speeds associated with indication as to preferred fan speeds; and selecting the predetermined fan speed associated with the indication as to a preferred fan speed that has been selected.

12. The process of claim 8 further comprising the steps of:

noting when a filter has been replaced;

issuing at least one command to a motor control for a motor which rotates the fan;

detecting the speed of the rotating fan;

computing a fan speed indicating when the filter needs to be replaced using the detected speed of the fan resulting from issuing at least one command to the motor control; and storing the computed fan speed indicating when the filter needs to be replaced for use as the predetermined fan speed in said step of comparing detected speed of the fan with a predetermined speed.

13. The process of claim 8 further comprising the steps of:

noting when a filter has been replaced;

issuing a plurality of commands to a motor control for a motor which rotates the fan;

detecting the speed at which the fan rotates for each issued command to the motor control;

computing speeds of the fan indicating when the filter needs to be replaced for each level of fan speed which may be selected; and storing the computed speed of the fan indicating when the filter needs to be replaced in association with a corresponding level of fan speed which may be selected.

* * * * *